June 18, 1968  F. J. LOWES  3,388,522
AIRCRAFT STIFFENING SECTION
Filed Oct. 11, 1965  2 Sheets-Sheet 1

INVENTOR.
Frederick J. Lowes
BY
Atty's.

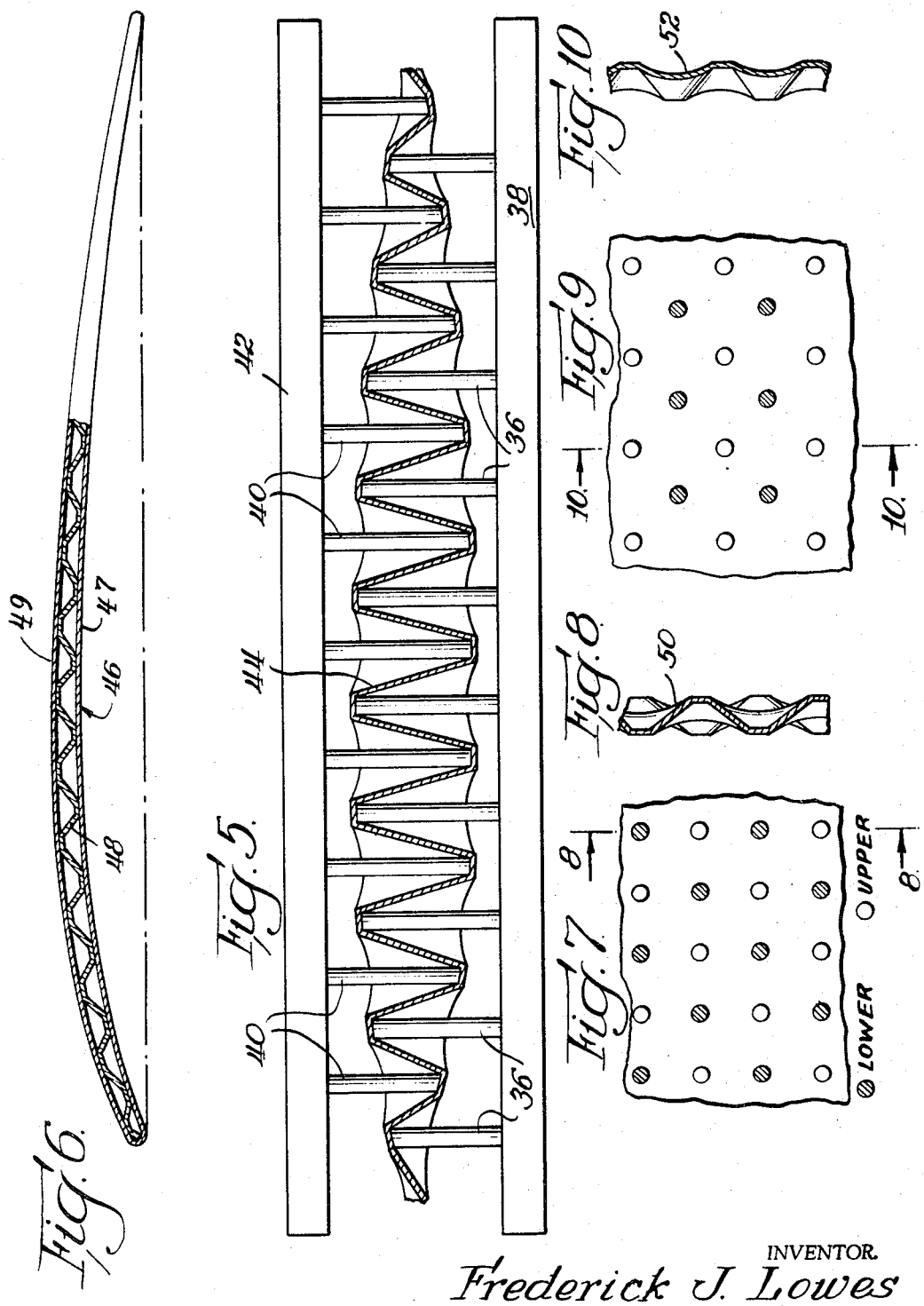

United States Patent Office 3,388,522
Patented June 18, 1968

3,388,522
AIRCRAFT STIFFENING SECTION
Frederick J. Lowes, Midland, Mich., assignor to The Dow Chemical Company, Midland, Mich., a corporation of Delaware
Substituted for abandoned application Ser. No. 172,666, Feb. 12, 1962. This application Oct. 11, 1965, Ser. No. 507,597
3 Claims. (Cl. 52—618)

ABSTRACT OF THE DISCLOSURE

This invention concerns stiffening sheet members having no straight lines of weakness and which can take varying cross-sectional forms. For example, such a sheet member can form the core of an air foil structure.

This application is a substitute for non-copending application Ser. No. 172,666, filed Feb. 12, 1962, now abandoned.

This invention relates to a method and means for forming a sheet of material for use as a stiffening member in a composite structure, as well as to the stiffening member formed by the method of the invention.

The rapid increase being made in aircraft and missile velocities has required greater strength air foils, and at the same time, has required that such air foils be made thinner.

The current practice utilized in the fabrication of high speed (Mach 2 or greater) aircraft wing sections, involves two general practices.

The first is to make the wing section in two parts, generally split on the mean cord, or neutral axis. The parts are forged from a given alloy to a very close approximation of the required dimensions, then machined so that desired tolerances are attained. To lighten the section, the back is "sunk" by either conventional, or chemical milling. The two sections, lower and upper contour, are then joined by a number of conventional techniques.

The second technique, which is most frequently used when fabricating large surfaces, is the honeycomb type of construction. Such construction involves the manufacture of a metallic hexagonal honeycomb sheet of suitable alloy joined by line welding, or polymeric adhesive. The honeycomb sheet is then milled, in a rather difficult and cumbersome manner, to form the desired wing contour, following which metallic skins are applied to the edge surfaces by either organic adhesive, or brazing. When using organic adhesives, a considerable amount must be used to assure adequate bonding, thus unnecessarily increasing the weight of the completed air foil. On the other hand, brazing techniques generally require an inert atmosphere, and surplus brazing material also unnecessarily contributes to the weight of the air foil.

An air foil made in accordance with the principles of the present invention, will be found to provide a solution to the problem of obtaining high strength and thinner sections in high speed aircraft wing structure.

Yet another object of the invention is to provide an air foil stiffening member having no straight lines of weakness.

Briefly, the inventive concept involves the formation of a series of substantially hyperbolic paraboloidal areas in a sheet of material. The vertical cross-sectional dimensions of the formed sheet are variable, thus making such formed sheets useful for specialized application, such as in wing structures, i.e., air foils, used on aircraft. It will be found that the cost of a wing structure made in accordance with the principles of the present invention, will be somewhere between the cost of the first and second techniques discussed above.

The main object of this invention is to provide a method and means for forming a sheet of material for use as a stiffening member in a composite structure.

A more specific object is to provide a method and means for the formation of a series of substantially hyperbolic paraboloidal areas in a sheet of material.

Another object of the invention is to provide a method and means for the formation of an air foil stiffening member, which is of medium cost, and possesses high strength and low weight, as compared with air foils made by conventional methods.

Still another object of the invention is to provide a method and means for the formation of a series of substantially hyperbolic paraboloidal areas in a sheet of material, wherein the vertical cross-sectional dimensions are variable.

A further object is to provide a stiffening member for use in an air foil, which member has a plurality of indentations arranged so that the vertical distance between the air foil surfaces are of variable dimension.

These and further objects and features of the invention will become more apparent from the following description and accompanying drawings wherein:

FIG. 5 is a side view similar to FIG. 2, but showing a modified type of peg die arrangement;

FIG. 6 is a partial section view of a stiffener section made from a sheet of material formed in a peg die arrangement of the invention;

FIG. 7 is a plan view illustrating the relative position of various rods—when the supporting die plates are brought together—in a first type of peg die arrangement;

FIG. 8 is a section view through a sheet of material when formed in the peg die arrangement of FIG. 7, and as seen along line 8—8 in FIG. 7;

FIG. 9 is a plan view illustrating the relative position of various rods—when the supporting die plates are brought together—in a second type of peg die arrangement; and FIG. 10 is a section view through a sheet of material when formed in the peg die arrangement of FIG. 9, and as seen along line 10—10 in FIG. 9.

Figure 1:
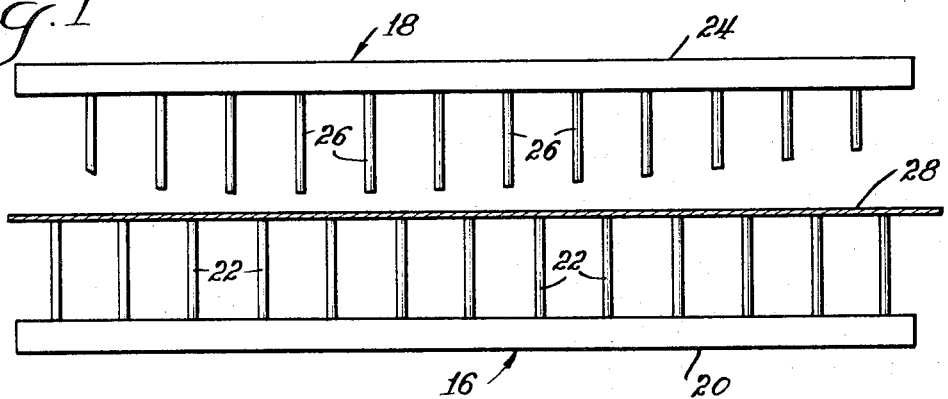
FIG. 1 is a side view of a peg die arrangement used in the practice of the invention.
Figure 2:
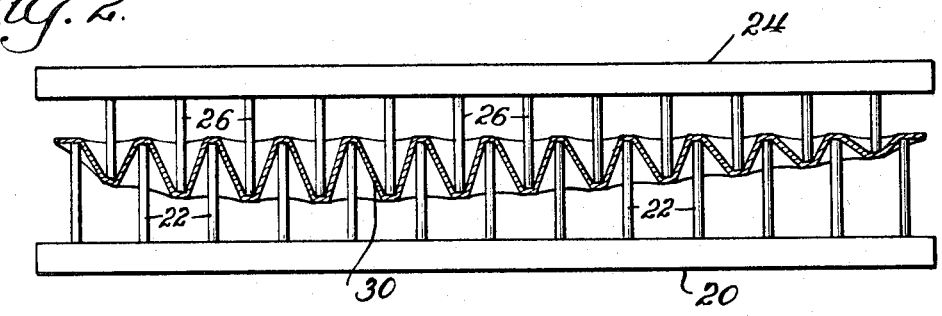
FIG. 2 is the same but showing a sheet of material in process of formation.

Referring now to the drawings, and more particularly to FIGS. 1 and 2, a peg die arrangement is illustrated, which includes a lower die portion 16, and an upper die portion 18. The lower die portion is formed of a flat plate 20, and a plurality of pegs, or rods 22, of equal height, secured normal to the plate in accordance with a given repetitive pattern. The upper die portion is formed of a flat plate 24, and a plurality of pegs, or rods 26, of variable height secured normal to the plate in accordance with a given repetitive pattern. The variable height of the pegs 26 will generate a curve if all end points thereof are joined, such curve simulating the contour of one side of an air foil. It will be understood, that the pegs 22 and 26, in addition to extending a given distance across the width of their respective plate, also extend a given distance along the length of their respective plate to provide the desired air foil taper along the length thereof. The pegs 22 and 26, are arranged to interfit in predetermined lateral spaced relationship, when the die portions 16 and 24, are moved toward each other.

Figure 3:
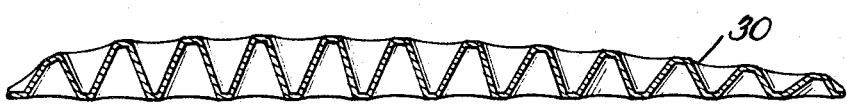
FIG. 3 is a section view taken through a sheet of material formed in the peg die arrangement of FIG. 1.

A flat sheet of ductile material 28, such as aluminum, magnesium, and their alloys, stainless steel, etc., which is to be formed, or operated upon, is placed in the peg die arrangement so that it rests upon the pegs 22. Relative movement is effected between the die portions 16 and 18, which causes a plurality of indentations to be formed in the sheet, as illustrated in cross-section in FIG. 3. The forming step may be completed in one operation, hot or cold, or annealed and drawn in successive steps.

It will be understood, that the peg die arrangements 16 and 18, are placed in suitable press equipment (not shown) such as a double action draw press where a pressure plate is utilized, or in a hydraulic press where the draw rate may be controlled. In the latter case, a draw ring may be advantageously used.

After the formed sheet 30 is trimmed, it may be joined to a similarly formed and trimmed sheet 32 by means, such as spot welding, at points of contact, more particularly at the flat surface areas formed by the ends of the pegs 22. The resulting assemblage is then covered by a metal skin 34 which is secured by spot welding, or adhesively bonded to the sheets 30 and 32 to form the completed surface. An air foil made in such manner will be found to be much stronger than those formed by more conventional methods, one reason being the bonding of flats of greater surface as compared to the relatively smaller bonding surfaces as found in comparable structures. Also, because there are a joined series of substantially hyperbolic paraboloidal areas over the entire area of each sheet 30 and 32, no straight lines of weakness exist within the sheets.

Figure 4:
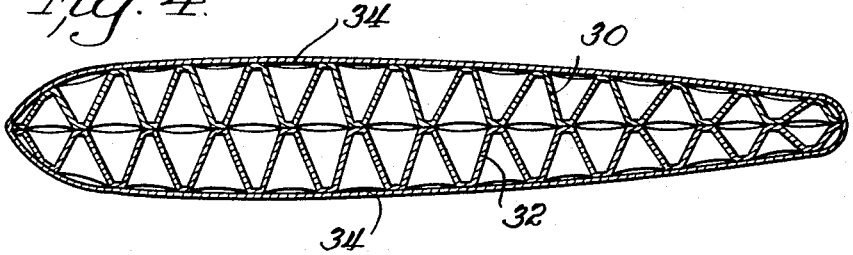
FIG. 4 is a section view illustrating an assemblage of two sheets of the type shown in FIG. 3.

A modified form of peg die arrangement is illustrated in FIG. 5, which differs from that described above chiefly in the fact that the indentations formed by the pegs, generate points of a curve on both sides of the material upon drawing, which is equivalent in form to the exterior surfaces of the composite air foil shown in FIG. 4. Toward this end, a plurality of pegs, or rods 36, affixed to a lower die plate 38, have the ends of the pegs at variable heights to generate the desired curve, while a plurality of pegs, or rods 40, affixed to an upper die plate 42, have the ends of the pegs arranged at variable heights to generate a similar curve.

It will be seen, that a sheet of material 44, formed in the peg die arrangement of FIG. 5, will have sets of indentations arranged to provide a stiffening section for an air foil having both skin surfaces curved uniformly from the lead edge thereof.

It may be mentioned that the lateral spacing of the pegs, need not be uniform. That is in forming a sheet for use in an application having areas of high stress, such as at the thin ends of a section, it may be desirable to place the pegs of the forming die closer together in the region of high stress to provide more material in a transverse (vertical) direction so as to accommodate the higher stress.

Other modifications of formed sheets may be advantageously made in peg die arrangements embodying the principles of the invention. For example, an air foil assemblage 46 shown in FIG. 6, including a stiffener section 48, may be used as a stiffening layer in a conventional wing structure having ribs and spars. Thus, viewing FIG. 6, for example, a bottom skin 47 would actually be the upper skin of a conventional wing on which the stiffener 48 is attached and which is in turn covered by another skin 49 on the top thereof.

As has been mentioned, the arrangement of the pegs may be varied. Consider the arrangement illustrated in FIG. 7, which illustrates how the pegs of a lower and an upper die arrangement interfit when moved toward each other. It will be seen that the pegs of the lower die, shown in cross-hatching, will provide a rectangular pattern relative to the pegs of the upper die. A flat plate 50, operated upon in the peg die arrangement of FIG. 7, will have the cross-section shown in FIG. 8. In FIG. 9, the pegs of the lower die, will provide a hexagonal pattern relative to the pegs of the upper die. A flat plate 52, operated upon in the peg die arrangement shown in FIG. 9, will have the cross-section shown in FIG. 10. Accordingly, the spacing of the pegs in the FIG. 7 arrangement will lead to a geodetic weld pattern, whereas the spacing of the pegs in the FIG. 9 arrangement will give a linear pattern, which under certain conditions, is easier to fabricate. In either case, the area of a formed sheet between each four pegs of one die portion, approximates a hyperbolic paraboloid, having the equation $$\frac{x^2}{a^2} - \frac{y^2}{b^2} = cz$$

It will be obvious that a sheet formed in the manner as disclosed above, may find application in other than air foil structures. For example, formed sheets having varying cross-sections formed in accordance with the principles of the invention, could find use as reinforcements in unusual architectural structures, automotive body parts, and the like. Furthermore, the sheet material being used may be of different thickness—such as by welding or bonding sheets together—before drawing operations, to provide greater strength in certain areas, and in addition to being metal, may be in plastic, or fibre reinforced plastic sheets.

The foregoing description has been given in detail without thought of limitation since the inventive principles involved are capable of assuming other forms without departing from the spirit of the invention or the scope of the following claims.

Accordingly, what is claimed as new is:

1. An air foil structure including a pair of stiffening members, each member comprising a sheet of rigid material having joined series of substantially hyperbolic paraboloidal areas over the entire area of said sheet, one side of said sheet having a surface which lies substantially in a flat plane while the other side of said sheet lies in a curved plane, the shape of one sheet approximating the curve of one surface of said air foil, and the shape of the other sheet approximating the curve of the other surface of said air foil, and said pair being joined together at their flat plane surfaces to form said air foil structure.

2. An air foil structure including a stiffening member comprising a sheet of rigid material having joined series of substantially hyperbolic paraboloidal areas over the entire area of said sheet whereby no straight lines of weakness exist within said sheet, one side of said sheet having a surface which lies substantially in one plane while the other side of said sheet lies in another plane, the plane of at least one of said sides being curved.

3. The air foil structure of claim 4 wherein the plane of the other of said sides is substantially flat.

References Cited

UNITED STATES PATENTS

| | | | |
|---|---|---|---|
| 2,391,997 | 1/1946 | Noble | 244—119 |
| 2,481,046 | 9/1949 | Scurlock | 161—131 X |
| 2,858,247 | 10/1958 | De Swart | 52—618 X |
| 2,978,006 | 4/1961 | Clemens | 161—127 X |
| 2,988,959 | 6/1961 | Pelkey et al. | 52—615 X |
| 3,052,431 | 9/1962 | Compton | 244—117.1 |
| 3,151,712 | 10/1964 | Jackson | 52—615 |
| 3,227,598 | 1/1966 | Robb | 161—127 X |
| 3,258,892 | 7/1966 | Rushton | 52—615 |

DAVID J. WILLIAMOWSKY, *Primary Examiner.*

D. L. TAYLOR, *Examiner.*